United States Patent Office 3,160,526
Patented Dec. 8, 1964

3,160,526
ALKALINE STORAGE BATTERY AND ELECTROLYTE
Paul Ruetschi, Yardley, Pa., assignor to The Electric Storage Battery Company, a corporation of New Jersey
No Drawing. Filed Sept. 26, 1961, Ser. No. 141,570
6 Claims. (Cl. 136—6)

The present invention relates to alkaline storage batteries. More particularly, the present invention is concerned with new and improved storage batteries and an alkaline electrolyte therefore.

A specific object of the present invention is to provide a new and improved storage battery utilizing positive electrodes of cobalt and negative electrodes of zinc or magnesium.

Another object of the present invention is to provide a new and improved electrolyte for use in batteries of the so-called alkaline type.

It is known in the art that cobalt metal can be oxidized anodically in alkaline electrolyte to cobalt oxides. For the highest oxide of cobalt, a potential of +0.7 volt against a hydrogen electrode has been measured. This potential is higher than the potential of a silver peroxide electrode. Electrodes of cobalt oxide show reversibility with extreme ease. Still further, electrodes of cobalt oxide can store a very high amount of oxygen per unit volume and are twice as light as electrodes of silver oxide. The replacement of the silver oxide electrode in a silver-zinc alkaline battery system is also attractive from a cost standpoint. At the present market price, cobalt can be purchased at approximately ⅕ the price of silver.

In addition to utilizing a cobalt oxide electrode in combination with a zinc electrode, it is also proposed to use such an electrode in combination with a magnesium electrode. A cobalt-magnesium battery is approximately twice as light as a silver-zinc battery and has a voltage which is almost twice as high as a silver-zinc battery. Accordingly, the power output in watt hours per pound from a cobalt-magnesium cell is three to four times that of a silver-zinc cell. Accordingly, it is a further object of the present invention to provide a new and improved alkaline type battery characterized by an extremely high efficiency in terms of energy available in proportion to the weight of the battery.

In accordance with the present invention, there is utilized as the electrolyte for cobalt-zinc batteries and cobalt-magnesium batteries, quaternary ammonium electrolytes such as tetramethyl ammonium hydroxide, tetraethyl ammonium hydroxide, tetra-2-hydroxyethyl ammonium hydroxide, and methylbenzyldimethyl ammonium hydroxide. Quaternary ammonium electrolytes are also suitable for use in nickel-cadmium and silver-zinc battery systems or any alkaline battery system using electronegative materials such as zinc, magnesium, aluminum and alkali metals. The use of such electrolytes in alkaline storage batteries will result in better battery stand life and will reduce the amount of gas liberated at the negative electrodes.

Accordingly, it is another further object of the present invention to provide a new and improved electrolyte for use in alkaline type battery systems which will improve battery stand life and reduce gassing.

Other objects and advantages of the present invention will be apparent from the following description of preferred embodiments thereof.

In accordance with one embodiment of the present invention, cobalt oxide electrodes are utilized as the positive electrodes in an alkaline battery system. Cobalt oxide electrodes may be prepared by impregnating a porous matrix of nickel, cobalt, or graphite with molten cobalt nitrate. The impregnated porous plaques are then immersed in a solution of potassium hydroxide or any other suitable alkaline solution which results in the precipitation of cobalt oxide.

The positive electrode prepared in the manner described above is then utilized in a battery system with a negative electrode which may be a conventional zinc or magnesium electrode. By way of example, the zinc electrode may be made by sintering a plaque of pressed zinc oxide which may also comprise finely divided particles of zinc, homogeneously dispersed throughout a suitable binder. An aqueous solution of a quaternary ammonium hydroxide is utilized as the electrolyte of the battery systems of the present invention. By way of specific example, aqueous solutions of the following compounds may be utilized: tetramethyl ammonium hydroxide, tetraethyl ammonium hydroxide, tetra-2-hydroxyethyl ammonium hydroxide, and methylbenzyldimethyl ammonium hydroxide. The output voltage of the cobalt-magnesium cell constructed in accordance with the present invention approaches the theoretical cell voltage value of three volts. A cobalt-zinc cell in accordance with the present invention has an output voltage of two volts.

The use of quaternary ammonium electrolytes instead of the conventional electrolyte of potassium hydroxide or the hydroxides of other alkali metals provides several advantages. These substances are completely miscible with water and form stable electrolyte solutions. These electrolyte solutions are very strong bases because the substances are completely dissociated. The conductivity of these solutions is the same as that of conventional alkali hydroxide electrolytes. The use of quaternary ammonium electrolytes will result in batteries having much better stand life since the effect of these electrolyte solutions is to greatly increase the hydrogen overvoltage of the electrodes of alkaline storage battery systems. In addition, gassing at the negative electrodes in systems utilizing electrolyte in accordance with the present invention is minimized. Still further, the use of these electrolytes improves the recharge characteristics of the negative plates. This latter is particularly important in battery systems using electronegative materials such as zinc, magnesium, aluminum, and alkali metals.

While quaternary ammonium electrolytes are particularly adapted for use in cobalt-zinc and cobalt-magnesium battery systems as described above, they are also adapted for use in nickel-cadmium and silver-zinc battery systems. In such systems they provide the advantages in battery performance described above. In addition, these electrolytes may be utilized in nickel-cadmium and silver-zinc batteries without any modification to conventional batteries of these types. In order to provide an electrolyte having sufficient conductivity for battery application, the quaternary ammonium hydroxide should be present in the aqueous solution in an amount of at least 0.5 mols per liter for battery systems specified.

This application is a continuation-in-part of co-pending application Serial No. 769,592, filed October 27, 1958, now abandoned.

Having described the invention, that which is claimed as new is:

1. In an alkaline battery an electrolyte consisting essentially of an aqueous solution of a quaternary ammonium hydroxide having a concentration of at least 0.5 mol per liter.

2. In an alkaline battery an electrolyte consisting essentially of an aqueous solution of a quaternary ammonium hydroxide selected from the group consisting of tetramethyl ammonium hydroxide, tetraethyl ammonium hydroxide, tetra-2-hydroxyethyl ammonium hydroxide, and methylbenzyldimethyl ammonium hydroxide having a concentration of at least 0.5 mol per liter.

3. An alkaline battery comprising a positive electrode having active material of cobalt oxide, a negative electrode having active material selected from the group consisting of zinc and magnesium, and an electrolyte consisting essentially of an aqueous solution of a quaternary ammonium hydroxide having a concentration of at least 0.5 mol per liter.

4. An alkaline battery comprising a positive electrode having active material of cobalt oxide, a negative electrode having active material of zinc, and an electrolyte consisting essentially of an aqueous solution of a quaternary ammonium hydroxide having a concentration of at least 0.5 mol per liter.

5. An alkaline battery comprising a positive electrode having active material of cobalt oxide, a negative electrode having active material of magnesium, and an electrolyte consisting essentially of an aqueous solution of a quaternary ammonium hydroxide having a concentration of at least 0.5 mol per liter.

6. An alkaline battery comprising, in combination, a positive electrode comprising a porous plaque of material selected from the group consisting of nickel, cobalt, or graphite, impregnated with cobalt oxide, a negative electrode having active material selected from the group consisting of zinc, and magnesium, and an electrolyte consisting essentially of an aqueous solution of a quaternary ammonium hydroxide selected from the group consisting of tetramethyl ammonium hydroxide, tetraethyl ammonium hydroxide, tetra-2-hydroxyethyl ammonium hydroxide, and methylbenzyldimethyl ammonium hydroxide, said quaternary ammonium hydroxide being present in an amount to provide a concentration of at least 0.5 mol per liter.

References Cited in the file of this patent

UNITED STATES PATENTS

| | | |
|---|---|---|
| 701,804 | Edison | June 3, 1902 |
| 1,879,904 | Kranzlein | Sept. 27, 1932 |
| 2,458,878 | Ruben | Jan. 11, 1949 |
| 2,541,700 | Holt | Feb. 13, 1951 |
| 2,542,574 | Ruben | Feb. 20, 1951 |
| 2,566,114 | Bloch | Aug. 28, 1951 |
| 2,571,616 | Ruben | Oct. 16, 1951 |
| 2,636,851 | Juda et al. | Apr. 28, 1953 |
| 2,969,414 | Fleischer | Jan. 24, 1961 |
| 3,073,884 | Pinkerton | Jan. 15, 1963 |
| 3,110,630 | Wolfe | Nov. 12, 1963 |

OTHER REFERENCES

Vinal: Storage Batteries, 4th edition, 1955, pages 139, 142, 153.

Bikerman: "Chemical Abstracts," January-March 1955, vol. 49: 749g.